No. 765,561. PATENTED JULY 19, 1904.
E. CROWE.
SAFETY CONTROLLING GEAR FOR FLUID PRESSURE ENGINES.
APPLICATION FILED JUNE 15, 1903.
NO MODEL.
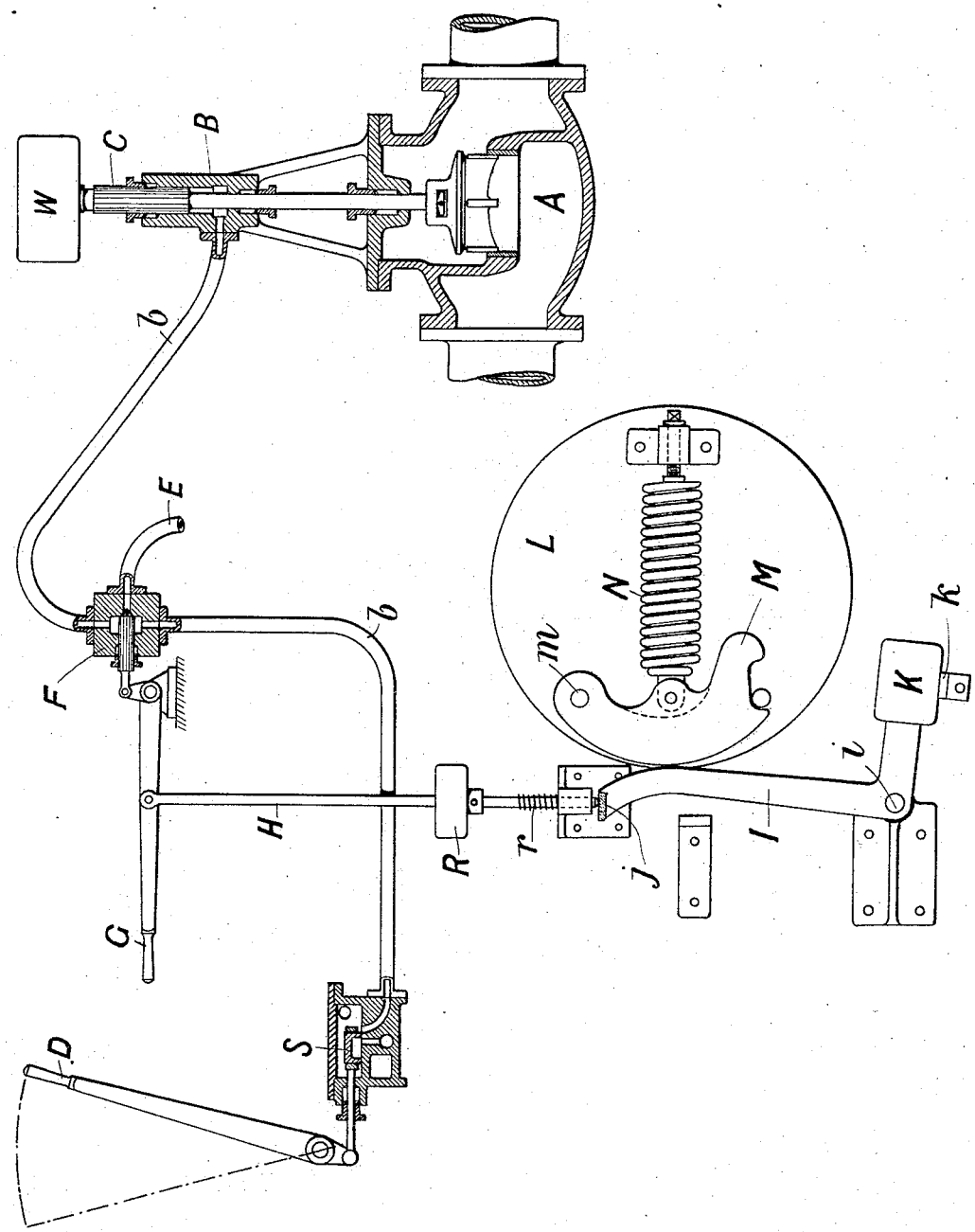
WITNESSES:
W. M. Avery
A. H. C. Davis
INVENTOR
Edward Crowe
BY
ATTORNEYS.

No. 765,561. Patented July 19, 1904.

UNITED STATES PATENT OFFICE.

EDWARD CROWE, OF SHEFFIELD, ENGLAND, ASSIGNOR OF ONE-HALF TO DAVY BROS., LIMITED, OF SHEFFIELD, ENGLAND, AN INCORPORATED COMPANY.

SAFETY CONTROLLING-GEAR FOR FLUID-PRESSURE ENGINES.

SPECIFICATION forming part of Letters Patent No. 765,561, dated July 19, 1904.

Application filed June 15, 1903. Serial No. 161,539. (No model.)

*To all whom it may concern:*

Be it known that I, EDWARD CROWE, engineer and chief draftsman, a subject of the King of Great Britain, residing at Birchholm, Bushey Wood, Totley Rise, Sheffield, in the county of York, England, have invented certain new and useful Improvements in Safety Controlling-Gear for Fluid-Pressure Engines, of which the following is a specification.

This invention relates to apparatus for automatically closing a stop-valve situated on the pressure-pipe leading to the engine when the engine attains or exceeds a certain speed, and has for its object the prevention of breakdowns consequent on accidental derangement or failure of the ordinary governing or controlling gear or (in the case of an engine controlled by hand) in consequence of negligence or inadvertence on the part of the engine-driver.

The apparatus consists of a stop-valve adapted to control the admission of pressure to the engine, the spindle of the valve being connected to a piston working in a cylinder and which on pressure being admitted to the cylinder will open the stop-valve against a weight or its equivalent. The pressure for thus opening the stop-valve may be steam or hydraulic or any other fluid-pressure, whichever may be most convenient. The admission of fluid-pressure to the cylinder is controlled by a valve worked by the engine attendant, and on the pipe connecting this valve with the cylinder is placed an exhaust-valve, which on being opened will allow the pressure to escape from the cylinder and the weight to close the stop-valve. This exhaust-valve is maintained in its closed position by trip mechanism adapted to be released by the action of a centrifugal governor, which on the engine attaining a certain predetermined limit of speed actuates the trip-gear to permit the exhaust-valve to open under the stress of a weight or spring, thereby releasing the pressure from the stop-valve cylinder and allowing the stop-valve to be closed in order to stop the engine.

The trip-gear is so arranged that it may be readily reset and the exhaust-valve closed again by the engine-driver.

The accompanying drawing illustrates the general arrangement, wherein—

A is the main steam stop-valve of the engine.

B is the hydraulic cylinder, and C the piston for operating the stop-valve A.

$b$ is the hydraulic-pressure-supply pipe.

W is the weight tending to close the valve A.

D is the lever for operating the slide-valve S, by means of which the engine-driver can open or close the steam stop-valve A independently of the other part of the apparatus.

E is the connection to the exhaust controlled by the exhaust-valve F.

G is a lever connected to the exhaust-valve F for closing the same, and H is a rod connected to lever G and normally supported on a trip-lever I for keeping the exhaust-valve closed to its seat. The trip-lever is pivoted at $i$ and normally held against a stop $k$ in position to support rod H by a balance-weight K.

L is the disk of a centrifugal governor driven by the engine-shaft, and M is a weight pivoted to the disk at $m$ and free to act by centrifugal force against the spring N, the tension of which can be adjusted so that the weight M will fly out when the engine has attained any predetermined limit of speed and by striking the trip-lever displace it from its position and permit rod H to fall under the impulse of a weight R, whereby the valve F is opened. The fall of the weighted rod is cushioned by a spring $r$.

The action of the apparatus is as follows: All parts being in the positions indicated on the drawing and on the engine attaining the predetermined speed for which the governor is adjusted, the weight M will fly out and move the trip-lever I, so that the end $j$, supporting the rod H, will be removed and allow H to fall and open the valve F. The pressure within cylinder B will then escape by means of pipe E to the exhaust and allow the weight W to close the stop-valve A. In order to start the engine again, the lever G is raised, closing the valve F and allowing pressure to accumulate in B and open the valve A, assuming valve S to be open to the admission. At the same time the weight K will return the lever I to its original position and support the rod H, so as to keep the exhaust-valve closed. The valve A can be opened or closed independently of this apparatus by means of valve S, actuated by the hand-lever D, the opening and closing of valve A being effected by the opening of valve S to the admission or exhaust, as the case may be.

I claim—

1. The combination with a stop-valve adapted to be opened and held open by fluid-pressure against an external force, of an exhaust-valve for controlling the release of the fluid-pressure to allow the stop-valve to close, a lever connected with the exhaust-valve, a rod secured to the lever, a counterpoised trip-lever with which the said rod engages, and a centrifugal governor for operating the trip-lever to permit the exhaust-valve to open, as set forth.

2. The combination with a stop-valve adapted to be opened and held open against an external force by fluid-pressure, of an exhaust-valve for controlling the release of the fluid-pressure to allow the stop-valve to close, a lever connected with the exhaust-valve, a weighted and cushioned rod secured to the lever, a weighted trip-lever with which the said rod engages, and a centrifugal governor for operating the trip-lever to permit the exhaust-valve to open, as set forth.

3. The combination with a stop-valve, a cylinder, a fluid-supply connected with the cylinder, and a weighted piston in the cylinder and connected with the stop-valve, of an exhaust-valve arranged in the fluid-supply, a lever connected with the exhaust-valve, a rod connected with the lever, an angular weighted trip-lever upon one member of which the rod is adapted to rest, and a centrifugal governor for operating the trip-lever, as set forth.

4. The combination with a stop-valve, a cylinder, a weighted piston working in a cylinder and connected with the stop-valve, a fluid-pressure valve, and a connection between the fluid-pressure valve and the cylinder, of an exhaust-valve arranged in the connection, a lever for operating the exhaust-valve, a weighted rod secured to the said lever, a pivoted and weighted trip-lever with which the said rod engages, and a centrifugal governor for operating the trip-lever, as set forth.

EDWARD CROWE.

Witnesses:
BAIN L. CAMPBELL,
W. H. SLATER.